United States Patent
Li et al.

(10) Patent No.: US 9,471,386 B2
(45) Date of Patent: Oct. 18, 2016

(54) ALLOCATING RESOURCES TO TASKS IN A BUILD PROCESS

(71) Applicant: International Business Machines Corporation, Armonk, NY (US)

(72) Inventors: Tong Li, Beijing (CN); Xin Peng Liu, Beijing (CN); Jia Tan, Beijing (CN); Xi Ning Wang, Beijing (CN); Bo Yang, Beijing (CN); Lian Ping Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 14/191,944

(22) Filed: Feb. 27, 2014

(65) Prior Publication Data
US 2014/0325521 A1  Oct. 30, 2014

(30) Foreign Application Priority Data

Apr. 28, 2013  (CN) .......................... 2013 1 0154425

(51) Int. Cl.
  *G06F 9/50*  (2006.01)
(52) U.S. Cl.
  CPC .......... *G06F 9/5038* (2013.01); *G06F 9/5027* (2013.01)
(58) Field of Classification Search
  None
  See application file for complete search history.

(56) References Cited

U.S. PATENT DOCUMENTS

| | | | |
|---|---|---|---|
| 7,086,063 B1 | 8/2006 | Ousterhout et al. | |
| 7,676,788 B1 | 3/2010 | Ousterhout et al. | |
| 8,042,089 B2 | 10/2011 | Ousterhout et al. | |
| 2005/0283786 A1* | 12/2005 | Dettinger | G06Q 10/10 718/104 |
| 2008/0072230 A1* | 3/2008 | Jackson | G06F 9/4843 718/104 |
| 2009/0025004 A1* | 1/2009 | Barnard | G06F 9/50 718/104 |
| 2009/0070750 A9 | 3/2009 | Gu | |
| 2009/0106765 A1 | 4/2009 | Mockford | |
| 2011/0239220 A1* | 9/2011 | Gibson | G06F 1/3206 718/103 |
| 2011/0276939 A1 | 11/2011 | Frankin et al. | |
| 2012/0185848 A1* | 7/2012 | Devarakonda | G06F 9/45533 718/1 |
| 2013/0055253 A1 | 2/2013 | Jubran et al. | |
| 2013/0290968 A1* | 10/2013 | Jiang | G06Q 10/06 718/102 |
| 2013/0311226 A1* | 11/2013 | Dreselly | G06Q 10/0631 705/7.23 |

OTHER PUBLICATIONS

Hou et al., "ADEM: Automating deployment and management of application software on the Open Science Grid," 10th IEEE/ACM International Conference on Grid Computing, Oct. 2009, pp. 130-137.

* cited by examiner

*Primary Examiner* — Abdullah Al Kawsar
*Assistant Examiner* — Jorge A Chu Joy-Davila
(74) *Attorney, Agent, or Firm* — Yee & Associates, P.C.; Stephen R. Yoder (57) ABSTRACT

Allocating resources for tasks in a build process is provided. The build process includes a plurality of tasks. Task metadata is obtained. The task metadata comprising a task type of a second task in the plurality of tasks. Execution metadata is obtained. The execution metadata comprising an execution result of a first task in the plurality of tasks. The second task depends on the execution result of the first task. A resource required by the second task is determined according to the task metadata and the execution metadata.

18 Claims, 2 Drawing Sheets

ALLOCATING RESOURCES TO TASKS IN A BUILD PROCESS

This Application is a counterpart of and claims the benefit of priority to China Patent Application Serial No. CN201310154425.3, filed on Apr. 28, 2013, the contents of which are hereby incorporated by reference.

BACKGROUND

1. Field

The present invention relates to the field of software engineering, more particularly, to a method and system for allocating resources to tasks in a build process.

2. Description of the Related Art

Figure 2:
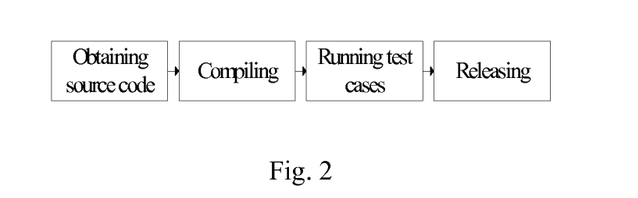
FIG. 2 shows an example of a typical build process.

In software engineering, build systems are applied more and more widely. A build process usually comprises a plurality of phases from obtaining software code up to forming a releasable software product. FIG. 2 shows a typical build process. This build process comprises a plurality of tasks, e.g., obtaining source code, compiling, running test cases and releasing.

For each build process, corresponding resources need to be consumed, and these resources are usually statically allocated at the initial phase. These statically allocated resources will not change dynamically during the build process, such that during the entire build process, sometimes there are excessive resources which other build processes cannot consume, while sometimes resources are not sufficient so as to make the time of the build process too long.

SUMMARY

Embodiments of the present invention provide a method for allocating resources to tasks in a build process to improve resource utilization efficiency. Further embodiments of the present invention also provide a system for allocating resources to tasks in a build process.

According to an embodiment of the present invention, there is a method for allocating resources to tasks in a build process, the build process comprising a plurality of tasks, the method comprises: obtaining task metadata, the task metadata comprising a task type of a second task in the plurality of tasks; obtaining execution metadata, the execution metadata comprising an execution result of a first task in the plurality of tasks, wherein the second task depends on the execution result of the first task; and determining a resource required by the second task according to the task metadata and the execution metadata.

According to another embodiment of the present invention, there is provided a system for allocating resources to tasks in the build process, wherein the build process comprises a plurality of tasks, the system comprises: a first capturing module configured to obtain task metadata, the task metadata comprising a task type of a second task in the plurality of tasks; a second obtaining module configured to obtain execution metadata, the execution metadata comprising an execution result of a first task in the plurality of tasks, wherein the second task depends on the execution result of the first task; and a resource requirement determining module configured to determine a resource required by the second task according to the task metadata obtained by the first capturing module and the execution metadata obtained by the second capturing module.

BRIEF DESCRIPTION OF THE SEVERAL VIEWS OF THE DRAWINGS

Features of the present disclosure will become more apparent through the more detailed description below of some embodiments of the present disclosure in conjunction with the accompanying drawings, wherein the same reference numerals generally refers to the same components in embodiments of the present disclosure.

DETAILED DESCRIPTION

Some preferred embodiments will be described in more detail below with reference to the accompanying drawings. While the drawings illustrate preferred embodiments of the present disclosure, it is understood that the present disclosure can be implemented in various manners, and should not be limited to the embodiments disclosed herein. On the contrary, those embodiments are provided for a thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
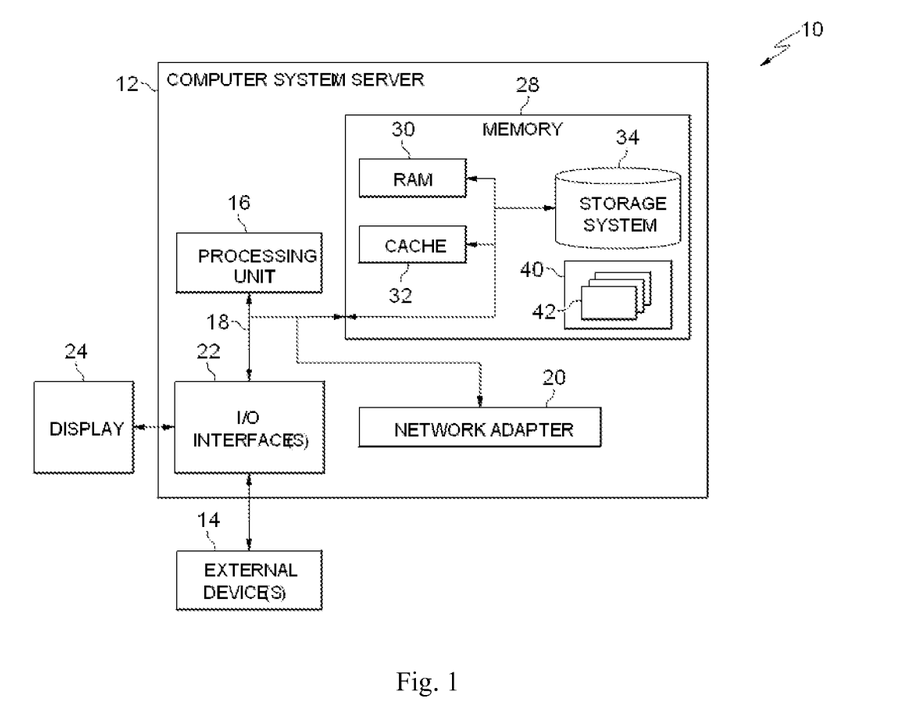
FIG. 1 shows a block diagram of an exemplary computer system/server which is applicable to implement embodiments of the present invention.

Now referring to FIG. 1, in which an exemplary computer system/server 12 which is applicable to implement embodiments of the present invention is shown. Computer system/server 12 shown in FIG. 1 is only illustrative and is not intended to suggest any limitation as to the scope of use or functionality of embodiments of the invention described herein.

As shown in FIG. 1, computer system/server 12 is represented in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
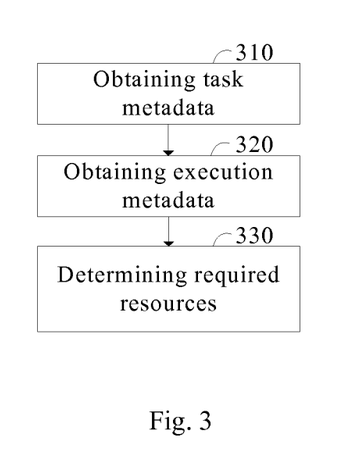
FIG. 3 shows a schematic flow diagram of a method for allocating resources to tasks in a build process according to an embodiment of the present invention.

Now referring to FIG. 3, it shows a method for allocating resources to tasks in a build process provided by an embodiment of the present invention. The method comprises: step 310, obtaining task metadata; step 320, obtaining execution metadata; and step 330, determining a resource required by a second task according to the task metadata and the execution metadata, wherein the task metadata comprise a task type of the second task; the execution metadata comprises: an execution result of a first task; the second task depends on the execution result of the first task. The build process in the present embodiment includes a plurality of tasks.

Using the method provided in the present embodiment, for the second task depending on the execution result of the first task, the resource required by the second task may be determined according to the execution result of the first task and the task type of the second task, so as to reasonably allocate a current resource to the second task according to a currently available resource. Thus, during the entire build process, with the execution of different tasks, resources are allocated dynamically. For example, more computing resources may be allocated to CPU-intensive tasks, and more network resources may be allocated to network-intensive tasks. This can avoid that the resources cannot be sufficiently utilized due to statically allocating resources before the build process starts, and can also avoid that the build time becomes too long due to insufficient resources caused by statically allocating resources.

In an embodiment of the present invention, the build process, for example, includes a plurality of tasks executed from software code to a releasable software product. The present invention does not limit the build process to these, and it may also include only at least two of the above plurality of tasks, or include more tasks, for example, uploading, deployment, etc. The build process may include building of a plurality of components, or include building of only one component. The build process may be performed in phases, for example, first obtaining the source code of all the components, and then compiling the source code of all the components; or the build process may be performed according to components, for example, first obtaining the source code of component A and compiling the source code of component A, then obtaining the source code of component B, and compiling the source code of component B; or the tasks in the build process may also be performed in other predetermined sequences. The present invention does not limit the execution sequence of the tasks during the build process.

In the embodiment shown in FIG. 3, the task type includes, for example, obtaining the source code, compiling, running test cases, uploading, deployment, etc. Resources include, for example, network resources, CPU resources, memory resources and hard disk resources, etc. In a virtual environment or cloud environment, resources include, for example, virtual network resources, virtual CPU resources, virtual memory resources and virtual hard disk resources. The execution result includes, for example, the number of retrieved codes, the number of test cases, and the size of the compiled package. The present invention does not limit the task type, resources and execution result to the above examples. During a build process, there are dependencies among tasks, for example, some task is directly influenced by the execution result of one or more other tasks. For example, compiling depends on the execution result of obtaining source code; the task of uploading build results only has an indirect relationship with obtaining the source code, and this is not dependency; for further example, both uploading build results and application deployment depend on the execution result of compiling. In an embodiment of the present invention, the dependencies among tasks may vary due to different technical means adopted or different execution sequences of tasks. For example, if the number of test cases is known by scanning the source code after the task of obtaining the source code, then the task of running test cases depends on the execution result of obtaining the source code; if the number of test cases is known by analyzing the compiled code, the task of running test cases is only indirectly influenced by the task of obtaining the source code.

In an embodiment of the present invention, step 310 may be obtaining the task metadata from a build task configuration file. The configuration file includes, for example, types of tasks, an execution sequence of tasks, dependency relationships of tasks, etc. Those skilled in the art may appreciate that other technical means may also be used to obtain the task metadata. For example, the task metadata may be obtained by analyzing the execution result of the first task or other executed tasks during the build process. For example, a dependency relationship among tasks may be obtained by build pipeline analysis. Build pipeline analysis can also know workload characteristics of the task, for example, whether the task is computation-intensive or memory-intensive.

In an embodiment of the present invention, step 320 may be capturing the execution metadata during the build process. The step may, for example, be repeatedly executed during the entire build process. Those skilled in the art may understand that various technical means may be used to implement the capturing of metadata. For example, for the execution result of obtaining the source code and the execution result of compiling, the number of retrieves and the size of the compiled package may be obtained by static scanning. In an embodiment of the present invention, only the part in the execution result related to the resource requirement of the second task may be captured.

In an embodiment of the present invention, step 330 may determine a resource required by the second task according to the task metadata and execution metadata based on, for example, a predetermined rule or algorithm. For example, the task metadata obtained in step 310 is that the task type of the second task is compiling. The second task depends on the first task, and the first task is to obtain the source code. The execution metadata obtained in step 320 is that the execution result of the first task is obtaining 100 thousands lines of source code. Step 330 determines that compiling the 100 thousands lines of source code needs a computation-intensive resource allocation according to a predetermined rule or algorithm.

Compared with statically allocating resources when or before the build process starts, the method provided by the above embodiments can realize dynamic resource allocation. For example, using the static resource allocation scheme, 8 CPUs, 8G memory, 50M bandwidth and 20G hard disk are allocated to the build process A before build process A starts. It may be seen that the computation resources of 6 CPUs and 4G memory resources are both in an idle state, not fully utilized, and since these resources have been allocated to the build process A, they cannot be utilized by other applications. In the mean time, since the bandwidth resource allocated to the build process A is not sufficient, it takes longer time for the task of obtaining the source code to complete. If the method provided by the above embodiments is used, 2 CPUs, 4G memory, 100M bandwidth and 10G hard disc resources may be dynamically allocated when executing the task of obtaining the source code, and the resource allocation may be adjusted dynamically when performing compiling, running test cases thereafter. For example, when the build process performs the compiling phase, 8 CPUs, 8G memory, 50M bandwidth and 20G hard disk are allocated to the compiling task according to the task type and the previously obtained execution results, such as the number of projects, the number of codes, parallelism degree of compiling, etc. By comparison, it may be seen obviously that the method provided by the above embodiment can improve the utilization efficiency of resources, and improve the efficiency of the build process as much as possible.

In an embodiment of the present invention, the task metadata comprises a dependency relationship among the plurality of tasks, and the dependency relationship among the plurality of tasks is for indicating that a task in the plurality of tasks depends on the execution result of one or more other tasks in the plurality of tasks. Before step 330, the embodiment shown in FIG. 3 may also include a step of: determining the second task is waiting for resource allocation according to the task just executed and the dependency relationship among the plurality of tasks. Those skilled in the art may understand that according to the dependency relationship among the tasks, as long as the task depended on by the second task has been executed, the resource required by the second task can be determined no matter whether the task to be executed next is the second task. If the task to be executed next is not the second task, the determined resource required by the second task may also be recorded for later use when allocating the resource to the second task.

In an embodiment of the present invention, the task metadata further comprises execution sequence data, the execution sequence data being for indicating an execution sequence of the plurality of tasks. The method provided by the embodiment shown in FIG. 3 may further comprise: obtaining resource metadata, the resource metadata being for indicating a currently available resource; determining that the next task to be executed is the second task according to the execution sequence data; allocating resources to the second task according to the resource metadata and the determined resource required by the second task. After the current task has been executed, the task to be executed next may be determined according to the execution sequence; and when the task to be executed next is the second task, since the resource required by the second task has been determined previously, resources may be allocated to the second task according to the currently available resource and the resource required by the second task. Those skilled in the art may appreciate that various technical means may be used to obtain resource metadata, for example, using an Infrastructure as a Service (IaaS) monitor service to obtain the usage information of physical resources or virtual resources, so as to know the available resource. For example, a snapshot of the available resource may also be obtained in order to know available resource at some time or the latest available resource. By knowing the currently available resource, according to the resource required by the second task as determined by the above embodiment, reasonably allocating resources to the second task may be realized. The specific resource allocation may be realized according to a current algorithm, for example, allocating resources according to a weight of the build task or the build capability desired to be delivered, or according to a Round Robin algorithm. The step of obtaining the resource metadata may be repeatedly executed during the build process, for example. Those skilled in the art may understand that the step of obtaining the resource metadata may be executed before, after or at the same time as the step of determining the resource required by the second task. For example, software product B includes component 1 and component 2. Build process B for software product B includes task 1 to task 8, wherein task 1 is to obtain the source code of component 1; task 2 is to compile the source code of component 1; task 3 is to run the test cases of component 1; task 4 is to upload component 1; task 5 is to obtain the source code of component 2; task 6 is to compile the source code of component 2; task 7 is to run the test cases of component 2; task 8 is to upload component 2. Build process B may be executing the tasks in the sequence of 1, 2, 3, 4, 5, 6, 7, 8, or in the sequence of 1, 5, 2, 4, 3, 7, 4 and 8. Build process B may also execute the above tasks in other sequences, as long as the dependency relationships among the tasks are complied with. For example, if task 5 is executed after task 1 has been executed, determining the resource required by task 2 may be performed after task 1 has been executed, or performed after task 5 has been executed. In an embodiment of the present invention, the obtained task metadata, execution metadata and resource metadata may be merged in a single file. A specific resource allocation may be realized by applying a specific algorithm, policy of resource allocation to this single file. In an embodiment of the invention, the contents of the above task metadata, execution metadata and resource metadata may be copied to a single file, and these metadata may be organized according to predetermined rules to form a single file for resource allocation. Embodiments of the present invention do not limit specific technical means for the merging. Those skilled in the art may understand that the above task metadata, execution metadata and resource metadata may also be recorded in the form of a record in the memory to accomplish resource allocation.

In an embodiment of the present invention, the execution metadata further comprises execution phase data, the execution phase data being for indicating that some current task has been executed. The step of determining that the second task is waiting for resource allocation according to the task just executed and the dependency relationship among the plurality of tasks may comprise: determining that the second task is waiting for resource allocation according to the execution phase data and the dependency relationship among the plurality of tasks.

In an embodiment of the present invention, not only the dependency relationship among the plurality of tasks may be obtained by acquiring, but also it may be preset, or default. The execution phase data may directly indicate that the current task has been executed, or it may be a condition for the execution of the current task to be completed. When the condition is satisfied, it may be determined that the current task has been executed. Those skilled in the art may understand that apart from obtaining the execution phase data, other means may be used to know that the current task has been executed, for example, the current task may be deemed to have been executed when the execution result of the current task is obtained.

In an embodiment of the present invention, before step 330, the method provided by the embodiment shown in FIG. 3 may further comprise: determining that the task to be executed next is the second task according to the execution sequence data, and determining that the second task is waiting for resource allocation. It may be understood that determining that the second task is waiting for resource allocation may be performed not only when or sometime after all the tasks depended on by the second task have been executed, but also when it is determined that the second task is to be executed.

In an embodiment of the present invention, the step of determining that the task to be executed next is the second task according to the execution sequence data further comprises: determining that the task to be executed next is the second task according to the execution sequence data and the execution phase data.

In an embodiment of the present invention, the task metadata further comprises the task type of the first task. The embodiment shown in FIG. 3 further comprises: determining the resource required by the first task according to the task type of the first task. In the build process, for the first task, resources may be statically allocated thereto using a current technique, or resources it requires may be determined according to the task type of the first task. For example, each task type corresponds to default required resources, and after obtaining the task type of the first task, the resource required by the first task may be known. In an embodiment of the present invention, determining the required resource according to the task type is performed, for example, for the task first executed of each component or the task first executed in the entire build process.

In an embodiment of the present invention, the execution metadata may further comprise, for example, execution abnormal information. After capturing the execution abnormal information, resource allocation may be stopped.

The above embodiments of the present invention may refer to and combine with each other to get more embodiments. For example, the embodiment shown in FIG. 3 may comprise both the steps of obtaining resource metadata and allocating resources, and the step of determining the resource required by the first task.

Figure 4:
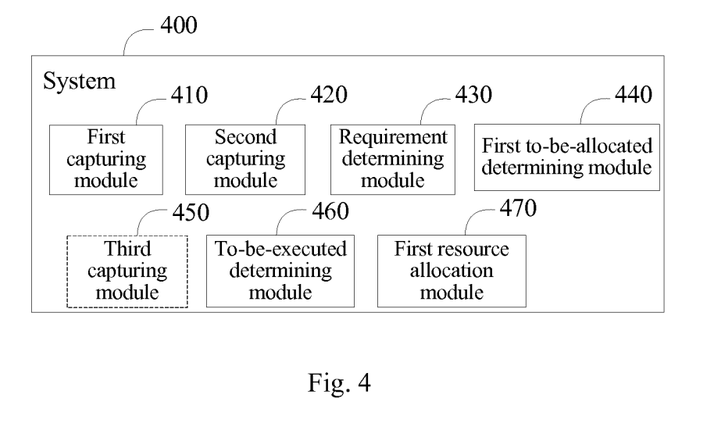
FIG. 4 shows a schematic structural diagram of a system for allocating resources to tasks in a build process according to an embodiment of the present invention.

Referring to FIG. 4, an embodiment of the present invention provides a system 400 for allocating resources to tasks in the build process. The build process includes a plurality of tasks. System 400 comprises: a first capturing module 410 configured to obtain task metadata, the task metadata comprising a task type of a second task in the plurality of tasks; a second capturing module 420 configured to obtain execution metadata, the execution metadata comprising an execution result of the first task in the plurality of tasks, wherein the second task depends on the execution result of the first task; resource requirement determining module 430 configured to determine a resource required by the second task according to the task metadata obtained by the first capturing module and the execution metadata obtained by the second capturing module.

Using the system provided by the present embodiment, for a second task depending on the execution result of a first task, the resource required by the second task may be determined according to the execution result of the first task and the task type of the second task, so as to reasonably allocate resources to the second task according to the currently available resource. Thus in the entire build process, with the execution of different tasks, resources are allocated dynamically.

In an embodiment of the present invention, the task metadata comprises dependency relationship among the plurality of tasks, the dependency relationship among the plurality of tasks being for indicating that a task in the plurality of tasks depends on an execution result of one or more other tasks in the plurality of tasks. System 400 further comprises: a first to-be-allocated determining module 440 configured to determine that the second task is waiting for resource allocation according to the task just executed and dependency relationship among the plurality of tasks. In the present embodiment, the resource requirement determining module 430 is further configured to, after the first to-be-allocated determining module 440 determined that the second task is waiting for resource allocation, determine a resource required by the second task according to the task metadata obtained by the first capturing module 410 and the execution metadata obtained by the second capturing module 420.

In an embodiment of the present invention, the task metadata further comprises execution sequence data, the execution sequence data being for indicating an execution sequence of the plurality of tasks. System 400 further comprises: a third capturing module 450 configured to obtain resource metadata, the resource metadata being for indicating the currently available resource; to-be-executed determining module 460 configured to determine that the task to be executed next is the second task according to the execution sequence; a first resource allocation module 470 configured to allocate resources to the second task according to the resource metadata and the determined resource required by the second task.

In an embodiment of the present invention, the execution metadata further comprises execution phase data, the execution phase data being for indicating that the current task completes execution. The first to-be-allocated determining module 440 is further configured to determine that the second task is waiting for resource allocation according to the execution phase data and the dependency relationship among the plurality of tasks.

Figure 5:
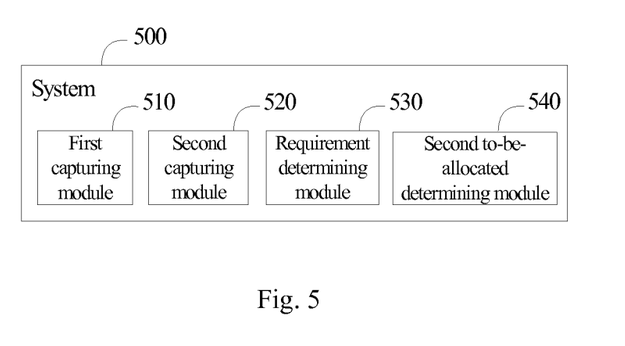
FIG. 5 shows a schematic structural diagram of another system for allocating resources to tasks in a build process according to an embodiment of the present invention.

As shown in FIG. 5, in an embodiment of the present invention, system 500 comprises a first capturing module 510, a second capturing module 520 and a requirement determining module 530. For specific implementations of the above modules and their connection relationships, reference may be made to the corresponding parts of the embodiment shown in FIG. 4. The task metadata further comprises execution sequence data, the execution sequence data being for indicating an execution sequence of the plurality of tasks. System 500 further comprises a second to-be-allocated determining module 540 configured to determine that the task to be executed next is the second task according to the execution sequence data, and to determine that the second task is waiting for resource allocation. The resource requirement determining module 530 is further configured to, after the second to-be-allocated determining module 540 determined that the second task is waiting for resource allocation, determine the resource required by the second task according to the task metadata obtained by the first capturing module 510 and the execution metadata obtained by the second capturing module 520.

In an embodiment of the present invention, the execution metadata further comprises execution phase data, the execution phase data is for indicating that some current task has been executed. The second to-be-allocated determining module 540 is further configured to determine that the task to be executed next is the second task according to the execution sequence data and the execution phase data.

In an embodiment of the present invention, both system 400 and system 500 may comprise the fourth capturing module and the second resource allocation module, wherein the fourth capturing module is configured to obtain resource metadata, the resource metadata being for indicating currently available resources; a second resource allocation module is configured to allocate resources to the second task according to the determined resource required by the second task and the resource metadata.

Dynamic resource allocation during the build process may be realized according to the systems 400 and 500 provided by the above embodiments, so as to improve the utilization efficiency of resources and make sure an effective progress of the build process.

For implementation details in the above apparatus embodiments of the present invention, reference may be made to the corresponding method embodiments, and they are not repeated here. Moreover, the above apparatus embodiments may refer to and combine with each other to get more embodiments.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for allocating resources for tasks during a build process, the build process comprising a plurality of tasks, the method comprising:
    obtaining task metadata, the task metadata comprising a task type of a second task in the plurality of tasks;
    obtaining execution metadata, the execution metadata comprising an execution result that is a result of executing a first task in the plurality of tasks, wherein the second task depends on the execution result of the first task;
    determining workload characteristics including resource usage characteristics of the second task based on the task metadata and the execution metadata;
    obtaining resource metadata, the resource metadata indicating a currently available resource;
    determining a resource required by the second task according to the task metadata and the execution metadata considering the workload characteristics of the second task; and
    allocating the resource required by the second task to the second task according to the resource metadata,
    wherein the obtaining the execution metadata, the determining the resource required by the second task, and the allocating the resource required by the second task are performed during the build process after completion of the first task.

2. The method of claim 1, wherein the task metadata comprises a dependency relationship among the plurality of tasks, the dependency relationship among the plurality of tasks indicating that a particular task in the plurality of tasks depends on an execution result of one or more other tasks in the plurality of tasks; and wherein
    before determining the resource required by the second task according to the task metadata and the execution metadata, the method further comprises: determining that the second task is waiting for resource allocation according to a different task that just executed in the plurality of tasks and the dependency relationship among the plurality of tasks.

3. The method of claim 2, wherein the task metadata further comprises execution sequence data, the execution sequence data indicating an execution sequence of the plurality of tasks that complies with the dependency relationship among the plurality of tasks; and wherein
    the method further comprises: obtaining resource metadata, the resource metadata indicating a currently available resource; determining that the second task is to be executed next according to the execution sequence data; and allocating the resource required by the second task to the second task according to the resource metadata.

4. The method of claim 2, wherein the execution metadata further comprises execution phase data, the execution phase data indicating that a current task completes execution; and wherein
    the determining that the second task is waiting for resource allocation according to the different task that just executed in the plurality of tasks and dependency relationships among the plurality of tasks comprises: determining that the second task is waiting for resource allocation according to the execution phase data and the dependency relationship among the plurality of tasks.

5. The method of claim 4, wherein the task metadata further comprises execution sequence data, the execution sequence data indicating an execution sequence of the plurality of tasks that complies with the dependency relationship among the plurality of tasks; and wherein
    before determining the resource required by the second task according to the task metadata and the execution metadata, the method further comprises: determining that the second task is to be executed next according to the execution sequence data; and determining that the second task is waiting for resource allocation.

6. The method of claim 5, wherein the execution metadata further comprises execution phase data, the execution phase data indicating that the current task completes execution; and wherein
    the determining that the second task is to be executed next according to the execution sequence data comprises:

determining that the second task is to be executed next according to the execution sequence data and the execution phase data.

7. A computer system for allocating resources to tasks in a build process, wherein the build process includes a plurality of tasks, the computer system comprising:
a bus;
a memory connected to the bus, wherein the memory stores program instructions; and
a processor connected to the bus, wherein the processor executes the program instructions to:
obtain task metadata, the task metadata comprising a task type of a second task in the plurality of tasks;
obtain execution metadata, the execution metadata comprising an execution result that is a result of executing a first task in the plurality of tasks, wherein the second task depends on the execution result of the first task;
determining workload characteristics including resource usage characteristics of the second task based on the task metadata and the execution metadata;
obtaining resource metadata, the resource metadata indicating a currently available resource;
determine a resource required by the second task according to the task metadata and the execution metadata considering the workload characteristics of the second task; and
allocate the resource required by the second task to the second task according to the resource metadata,
wherein the obtaining the execution metadata, the determining the resource required by the second task, and the allocating the resource required by the second task are performed during the build process after completion of the first task.

8. The computer system of claim 7, wherein the task metadata comprises a dependency relationship among the plurality of tasks, the dependency relationship among the plurality of tasks indicating that a particular task in the plurality of tasks depends on an execution result of one or more other tasks in the plurality of task; and wherein
the processor further executes the program instructions to:
determine that the second task is waiting for resource allocation according to a different task that just executed in the plurality of tasks and dependency relationships among the plurality of tasks; and
after determining that the second task is waiting for resource allocation, determine the resource required by the second task according to the task metadata and the execution metadata.

9. The computer system of claim 8, wherein the task metadata further comprises execution sequence data, the execution sequence data indicating an execution sequence of the plurality of tasks that complies with the dependency relationship among the plurality of tasks; and wherein
the processor further executes the program instructions to:
obtain resource metadata, the resource metadata indicating a currently available resource; determine that the second task is to be executed next according to the execution sequence data; and allocate the resource required by the second task to the second task according to the resource metadata.

10. The computer system of claim 8, wherein the execution metadata further comprises execution phase data, the execution phase data indicating that a current task completes execution; and wherein
the processor further executes the program instructions to determine that the second task is waiting for resource allocation according to the execution phase data and the dependency relationship among the plurality of tasks.

11. The computer system of claim 10, wherein the task metadata further comprises execution sequence data, the execution sequence data indicating an execution sequence of the plurality of tasks that complies with the dependency relationship among the plurality of tasks; and wherein
the processor further executes the program instructions to:
determine that the second task is to be executed next according to the execution sequence data, and determine that the second task is waiting for resource allocation; and
after determining that the second task is waiting for resource allocation, determine the resource required by the second task according to the task metadata and the execution metadata.

12. The computer system of claim 11, wherein the execution metadata further comprises execution phase data, the execution phase data indicating that a current task completes execution; and wherein the processor further executes the program instructions to determine that the second task is to be executed next according to the execution sequence data and the execution phase data.

13. A computer program product for allocating resources for tasks during a build process, the build process comprising a plurality of tasks, the computer program product comprising a non-transitory computer readable storage medium having program instructions embodied therewith, the program instructions executable by a computer to cause the computer to perform a method comprising:
obtaining task metadata, the task metadata comprising a task type of a second task in the plurality of tasks;
obtaining execution metadata, the execution metadata comprising an execution result that is a result of executing a first task in the plurality of tasks, wherein the second task depends on the execution result of the first task;
determining workload characteristics including resource usage characteristics of the second task based on the task metadata and the execution metadata;
obtaining resource metadata, the resource metadata indicating a currently available resource;
determining a resource required by the second task according to the task metadata and the execution metadata considering the workload characteristics of the second task; and
allocating the resource required by the second task to the second task according to the resource metadata,
wherein the obtaining the execution metadata, the determining the resource required by the second task, and the allocating the resource required by the second task are performed during the build process after completion of the first task.

14. The computer program product of claim 13, wherein the task metadata comprises a dependency relationship among the plurality of tasks, the dependency relationship among the plurality of tasks indicating that a particular task in the plurality of tasks depends on an execution result of one or more other tasks in the plurality of tasks; and wherein
before determining the resource required by the second task according to the task metadata and the execution metadata, the method further comprises: determining that the second task is waiting for resource allocation according to a different task that just executed in the plurality of tasks and the dependency relationship among the plurality of tasks.

15. The computer program product of claim 14, wherein the task metadata further comprises execution sequence data, the execution sequence data indicating an execution sequence of the plurality of tasks that complies with the dependency relationship among the plurality of tasks; and wherein the method further comprises: determining that the second task is to be executed next according to the execution sequence data.

16. The computer program product of claim 14, wherein the execution metadata further comprises execution phase data, the execution phase data indicating that a current task completes execution; and wherein the determining that the second task is waiting for resource allocation according to the different task that just executed in the plurality of tasks and dependency relationships among the plurality of tasks comprises: determining that the second task is waiting for resource allocation according to the execution phase data and the dependency relationship among the plurality of tasks.

17. The computer program product of claim 16, wherein the task metadata further comprises execution sequence data, the execution sequence data indicating an execution sequence of the plurality of tasks that complies with the dependency relationship among the plurality of tasks; and wherein before determining the resource required by the second task according to the task metadata and the execution metadata, the method further comprises: determining that the second task is to be executed next according to the execution sequence data, and determining that the second task is waiting for resource allocation.

18. The computer program product of claim 17, wherein the execution metadata further comprises execution phase data, the execution phase data indicating that a current task completes execution; and wherein the determining that the second task is to be executed next according to the execution sequence data comprises: determining that the second task is to be executed next according to the execution sequence data and the execution phase data.

* * * * *